United States Patent
Reeve (10) Patent No.: US 10,613,535 B2
(45) Date of Patent: Apr. 7, 2020

(54) DECISION MAKING

(71) Applicant: BAE SYSTEMS plc, London (GB)

(72) Inventor: Matthew James Reeve, Dorchester Dorset (GB)

(73) Assignee: BAE SYSTEMS plc (GB)

( * ) Notice: Subject to any disclaimer, the term of this patent is extended or adjusted under 35 U.S.C. 154(b) by 255 days.

(21) Appl. No.: 15/579,331

(22) PCT Filed: May 27, 2016

(86) PCT No.: PCT/GB2016/051538
§ 371 (c)(1),
(2) Date: Dec. 4, 2017

(87) PCT Pub. No.: WO2016/193678
PCT Pub. Date: Dec. 8, 2016

(65) Prior Publication Data
US 2018/0356826 A1    Dec. 13, 2018

(30) Foreign Application Priority Data

Jun. 4, 2015 (EP) ...................................... 15275147
Jun. 4, 2015 (GB) ................................... 1509679.5

(51) Int. Cl.
*G05D 1/02*    (2020.01)
*G06Q 10/06*    (2012.01)
(Continued)

(52) U.S. Cl.
CPC ........... *G05D 1/0206* (2013.01); *B63B 35/40* (2013.01); *G05D 1/0088* (2013.01); *G06N 5/046* (2013.01);
(Continued)

(58) Field of Classification Search
None
See application file for complete search history.

(56) References Cited

U.S. PATENT DOCUMENTS 6,381,538 B1    4/2002  Robinson et al.
8,150,621 B1    4/2012  Phillips et al.
(Continued)

FOREIGN PATENT DOCUMENTS

EP    2562701 A1    2/2013
WO    2016193678 A1    12/2016

OTHER PUBLICATIONS

International Search Report and Written Opinion received for Patent Application No. PCT/GB2016/051538, dated Jun. 28, 2016. 10 pages.

(Continued)

*Primary Examiner* — Jonathan M Dager
*Assistant Examiner* — Garrett F Evans
(74) *Attorney, Agent, or Firm* — Finch & Maloney PLLC (57) ABSTRACT

Disclosed is a system and method for facilitating decision making on a watercraft (100). The system comprises one or more processors (102) configured to: acquire environmental data comprising measurements of one or more parameters of an environment in a locality of the watercraft (100); provide a plurality of digital models, each digital model modelling an effect of the environment on a respective capability of the watercraft (100), each capability of the watercraft (100) being assigned to one or more actions, each action being performable by the watercraft (100) or an entity on the watercraft (100); using the environmental data and the digital models, model an effect of the environment on the capabilities of the watercraft (100); receive a selection of an action; and, using outputs of each digital model that models a capability that is assigned to the selected action, determine a risk assessment for the selected action.

20 Claims, 2 Drawing Sheets

(51) Int. Cl.
  *B63B 35/40*  (2006.01)
  *G05D 1/00*   (2006.01)
  *G06N 5/04*   (2006.01)
  *B63B 79/00*  (2020.01)
  *B63B 35/00*  (2020.01)

(52) U.S. Cl.
  CPC .......... *G06Q 10/0635* (2013.01); *B63B 79/00* (2020.01); *B63B 2035/007* (2013.01)

(56) References Cited

U.S. PATENT DOCUMENTS 8,494,697 B2 *  7/2013  Ballou ............... G08G 3/02
                                               701/21
8,594,866 B1    11/2013  Chen et al.
2009/0276105 A1 * 11/2009  Lacaze ............. G05D 1/0044
                                               701/2

OTHER PUBLICATIONS

GB Intellectual Property Office Search Report under Section 17(5) received for GB Patent Application No. 1509679.5 dated Dec. 7, 2015. 4 pages.
Extended European Search Report, pursuant to Rule 62 EPC, received for EP Patent Application No. 15275147.5 dated Nov. 13, 2015. 6 pages.
International Preliminary Report on Patentability received for Patent Application No. PCT/GB2016/051538, dated Dec. 14, 2017. 7 pages.

* cited by examiner

DECISION MAKING

FIELD OF THE INVENTION

The present invention relates to facilitating decision making on ships.

BACKGROUND

For many maritime operations, it is desirable to forecast the effect of environmental conditions on the performance of those operations. It is desirable to assess how the capability of a ship is affected by the environment in which that ship is operating, both at a current time and for a future time period.

SUMMARY OF THE INVENTION

In a first aspect, the present invention provides a system for facilitating decision making on a watercraft. The system comprises one or more processors configured to: acquire environmental data, the environmental data comprising measurements of one or more parameters of an environment in a locality of the watercraft; provide a plurality of digital models, each digital model modelling an effect of the environment on a respective capability of the watercraft, each capability of the watercraft being assigned to one or more actions, each action being performable by the watercraft or an entity on the watercraft; using the environmental data and the digital models, model an effect of the environment on the capabilities of the watercraft; receive a selection of an action; and, using outputs of each digital model that models a capability that is assigned to the selected action, determine a risk assessment for the selected action.

Preferably, the risk assessment is determined (and may also be displayed) in real-time as the environmental data is acquired.

Preferably, the environmental data is continually acquired, e.g. measured. More preferably, the environmental data is continuously acquired, e.g. measured. The risk assessment may be continually (e.g. continuously) determined and updated as more environmental data is acquired.

The watercraft may be a ship, a boat, a hovercraft, or a submarine.

The environmental data may include current measurements of the one or more parameters of the environment. The one or more processors may be configured to: using the current environmental data, model an effect of the current environment on the capabilities of the watercraft; and, using outputs of each digital model that models a capability that is assigned to the selected action, determine a risk assessment for the performance of the selected action at a current time.

The environmental data may include predicted measurements of one or more parameters of the environment for one or more future time-steps. The one or more processors may be configured to: using the environmental data, model an effect of the environment on the capabilities of the watercraft at each future time-step; and, using outputs of each digital model that models a capability that is assigned to the selected action, determine a risk assessment for the performance of the selected action at each future time-step.

The environmental data may include current measurements of the one or more parameters of the environment at one or more different locations, each different location being remote from the locality of the watercraft. The one or more processors may be configured to: using the environmental data, model an effect of the environment on the capabilities of the watercraft at each different location; and, using outputs of each digital model that models a capability that is assigned to the selected action, determine a risk assessment for the performance of the selected action at each of the different locations.

The one or more processors may be configured to: continuously acquire the environmental data; and, using the environmental data and the digital models, continuously model the effects of the environment on the capabilities of the watercraft.

The one or more processors may be wholly located on or in the watercraft.

The system may further comprise one or more sensors on or in the watercraft, the one or more sensors being configured to measure the environmental data.

The environmental data may include measurements of one or more parameters selected from the group of parameters consisting of: a temperature of a body of water on or in which the watercraft is operating, a salinity of a body of water on or in which the watercraft is operating, a speed of sound in of a body of water on or in which the watercraft is operating, a speed of the body of water, a flow direction of the body of water, a swell of the body of water, a wave period of the body of water, a temperature of air in which the watercraft is operating, wind speed, and wind direction.

The environmental data may include measurements of above and/or below water environmental conditions.

The environmental data may be provided by watercraft-board measurement equipment and/or delivered to the watercraft from a remote entity, for example, by a satellite or from ground transmitters.

The one or more processors may be further configured to acquire navigational data for watercraft. Modelling the effect of the environment on the capabilities of the watercraft may include using the acquired navigational data.

The system may further include a display for displaying the determined risk assessment. The system may further include a user input device for selecting an action from a plurality of actions.

The watercraft may include a vehicle (such as an auxiliary boat on an aircraft, e.g. a UAV) configured to be launched from the watercraft. The action may be an action to launch the vehicle from the watercraft.

The capabilities of the watercraft may include one or more capabilities selected from the group of capabilities consisting of: launching the vehicle, recovering the vehicle after launch, communicating with the vehicle, and controlling the vehicle.

In a further aspect, the present invention provides a method for facilitating decision making on a watercraft. The method comprises: acquiring, by one or more processors, environmental data, the environmental data comprising measurements of one or more parameters of an environment in a locality of the watercraft; providing a plurality of digital models, each digital model modelling an effect of the environment on a respective capability of the watercraft, each capability of the watercraft being assigned to one or more actions, each action being performable by the watercraft or an entity on the watercraft; using the environmental data and the digital models, modelling, by the one or more processors, an effect of the environment on the capabilities of the watercraft; receiving, by the one or more processors, a selection of an action; and, using outputs of each digital model that models a capability that is assigned to the selected action, determining, by the one or more processors, a risk assessment for the selected action.

The method may further include performing, e.g. by a human operator, a sensitivity analysis to determine how different values of environmental variables will impact the risk assessment.

In a further aspect, the present invention provides a program or plurality of programs arranged such that when executed by a computer system or one or more processors it/they cause the computer system or the one or more processors to operate in accordance with the method of the preceding aspect.

In a further aspect, the present invention provides a machine readable storage medium storing a program or at least one of the plurality of programs according to the preceding aspect.

DETAILED DESCRIPTION

Figure 1:
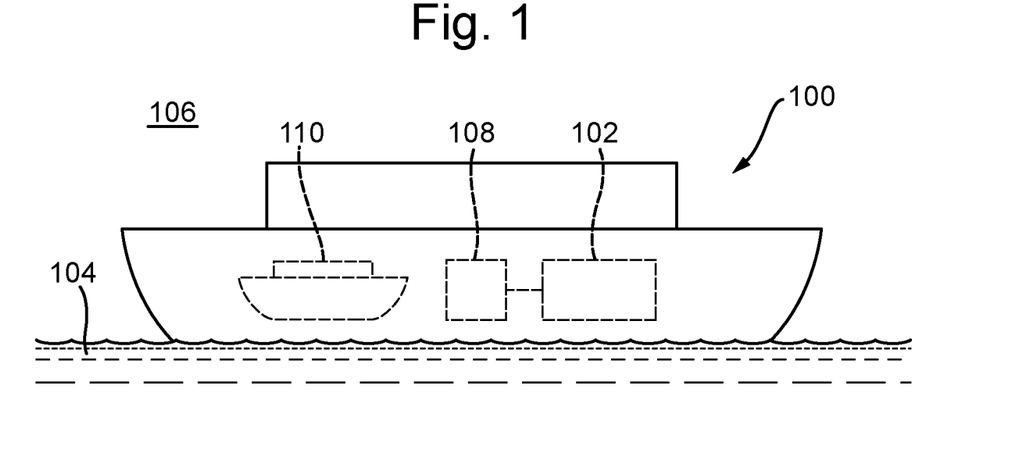
FIG. 1 is a schematic illustration (not to scale) of a ship on which an embodiment of a system for assessing an effect of current environmental conditions is implemented.

FIG. 1 is a schematic illustration (not to scale) of a ship 100 on which an embodiment of an environmental effect assessment module 102 is implemented.

In this embodiment, the environmental effect assessment module 102 is implemented on the ship 100. However, in other embodiments, the environmental effect assessment module 102 is implemented on a different type of watercraft, for example, a boat, a hovercraft, and a submarine.

The ship 100 is afloat on a body of water 104, for example an ocean or sea. The ship 100 is at least partially exposed to the air 106.

The ship 100 comprises the environmental effect assessment module 102, a plurality of shipboard sensors and ship subsystems (which are hereinafter referred to as the "sensor systems", and are collectively indicated in FIG. 1 by a single box and the reference numeral 108), and an auxiliary boat 110.

The environmental effect assessment module 102 is described in more detail later below with reference to FIG. 2. The environmental effect assessment 102 is coupled to the sensor systems 108 such that signals may be sent between the environmental effect assessment module 102 and the sensor systems 108.

The sensor systems 108 include any appropriate type of sensors or ship subsystems. Examples of appropriate types of shipboard sensors and ship subsystems include, but are not limited to, sensors and systems for measuring parameters of the body of water 104 (such as water temperature sensors, water flow speed sensors, water sound speed sensors etc.), sensors and systems for measuring parameters of the air 106 (such as air temperature sensors, wind speed and direction sensors, etc.), sensors and systems for measuring parameters of the ship 100 (for example, a GPS system for determining a global position of the ship 100, and an inertial navigation unit configured to measure attitude parameters of the ship 100, including pitch, roll, and heading), and sensors and systems for measuring parameters of the auxiliary boat 110 (for example, a system for determining a position of the auxiliary boat 110 relative to the ship 100, and an auxiliary boat navigation unit configured to measure attitude parameters of the auxiliary boat 110 relative to the ship 100, including pitch, roll, and heading). The sensor systems 108 may include sensors for measuring conditions below the surface of the body of water 104, such as sound speed, temperature, and salinity. The sensor systems 108 may include sensors for measuring conditions above the surface of the body of water 104, such as wind, temperature, pressure, and humidity.

In this embodiment, the auxiliary boat 110 is a watercraft configured to be launched from the ship 100. The auxiliary boat 110 is configured to move on the body of water 104 after the auxiliary boat 110 has been launched from the ship 100, and is capable of subsequently docking with the ship 100. The auxiliary boat 110 may be manned or unmanned. The auxiliary boat 110 may be autonomous, semi-autonomous, or be controlled by, for example, a human. For example, in some embodiments, the auxiliary boat 110 is configured to be remotely controlled by a human located on the ship 100.

Figure 2:
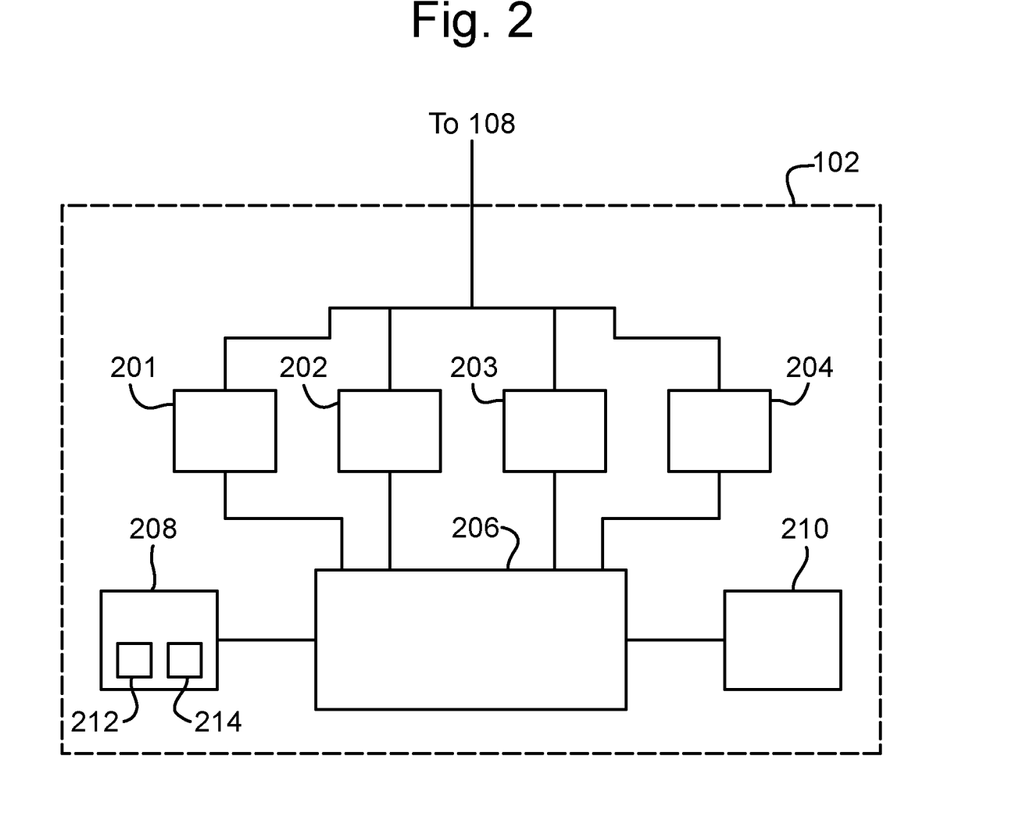
FIG. 2 is a schematic illustration (not to scale) showing further details of the system.

FIG. 2 is a schematic illustration (not to scale) showing further details of the environmental effect assessment module 102.

In this embodiment, the environmental effect assessment module 102 comprises a first module 201, a second module 202, a third module 203, a fourth module 204, an integration module 206, a database 208, and a user interface 210.

The first module 201 is coupled to the sensor systems 108 such that signals may be sent between the first module 201 and the sensor systems 108. The first module 201 is configured to receive and process signals from the sensor systems 108. The first module 201 includes one or more digital models for, using data from the sensor systems 108, modelling an effect of the body of water 104 on the auxiliary boat 110, for example, during and/or after a process of launching the auxiliary boat 110 from the ship 100. For example, the first environmental effect 201 module may determine, using measurements of the speed, swell, and/or wave period of the body of water 104, an effect of the body of water 104 on the auxiliary boat 110. The first module 201 may calculate an effect of the body of water 104 on the auxiliary boat 110 at a current time-step using current measurement readings from the sensor systems 108. Also, the first module 201 may estimate or predict an effect of the body of water 104 on the auxiliary boat 110 at one or more future time-steps, for example, using predicted or forecast parameter values and/or current measurements.

The second module 202 is coupled to the sensor systems 108 such that signals may be sent between the second module 202 and the sensor systems 108. The second module 202 is configured to receive and process signals from the sensor systems 108. The second module 202 includes one or more digital models for, using data from the sensor systems 108, modelling an effect of the air 106 on the auxiliary boat 110, for example, during and/or after a process of launching the auxiliary boat 110 from the ship 100. For example, the second module 202 may determine, using measurements of the wind speed and direction of the air 106, an effect of the air 106 on the auxiliary boat 110. The second module 202 may calculate an effect of the air 106 on the auxiliary boat 110 at a current time-step using current measurement readings from the sensor systems 108. Also, the second module 202 may estimate or predict an effect of the air 106 on the auxiliary boat 110 at one or more future time-steps, for example, using predicted or forecast parameter values and/or current measurements.

The third module 203 is coupled to the sensor systems 108 such that signals may be sent between the third module 203 and the sensor systems 108. The third module 203 is configured to receive and process signals from the sensor systems 108. The third module 203 includes one or more digital models for, using data from the sensor systems 108, modelling an effect of the body of water 104 on a sonar system of the ship 100 and/or the auxiliary boat 110. For example, the third module 203 may determine, using measurements of the speed, swell, and/or wave period of the body of water 104, a speed of an acoustic signal through the body of water 104, and may also determine an effect that the state of the body of water 104 has on a sonar system of the auxiliary boat 110. The third module 203 may calculate an effect of the body of water 104 on sonar propagation at a current time-step using current measurement readings from the sensor systems 108. Also, the third module 203 may estimate or predict an effect of the body of water 104 on the sonar system at one or more future time-steps, for example, using predicted or forecast parameter values and/or current measurements.

The fourth module 204 is coupled to the sensor systems 108 such that signals may be sent between the fourth module 204 and the sensor systems 108. The fourth module 204 is configured to receive and process signals from the sensor systems 108. The fourth module 204 includes one or more digital models for, using data from the sensor systems 108, modelling an effect of environmental conditions in the vicinity of the ship 100 on communications between the ship 100 and the auxiliary boat 110, for example, after the auxiliary boat 110 has been launched from the ship 100. For example, the fourth module 204 may determine, using measurements of parameters of the body of water 104 and the air 106, an effect on radio frequency (RF) communications. The fourth module 204 may calculate an effect of the local environmental conditions on ship-to-auxiliary boat communications at a current time-step using current measurement readings from the sensor systems 108. Also, the fourth environmental impact module 204 may estimate or predict an effect of the local environmental conditions on communications at one or more future time-steps, for example, using predicted or forecast parameter values and/or current measurements.

In this embodiment, the modules 201-204 are coupled to the integration module 206 such that respective signals may be sent between the integration module 206 and each of the modules 201-204.

The integration module 206 is configured to process, and integrate outputs of the modules 201-204. Operation of the integration module 206 is described in more detail later below with reference to FIG. 3.

In addition to being coupled to the modules 201-204, the integration module 206 is further coupled to the database 208 and the user interface 210 such that respective signals may be sent between the integration module 206 and each of the database 208 and the user interface 210.

The database 208 stores a list of actions 212. In this embodiment, the terminology "action" is used to refer to actions and tasks that are performable by the ship 100 and/or one or more ship-board entities, such as human personnel or ship subsystems. In this embodiment, the list of actions 212 stored by the database 208 includes an action to launch the auxiliary boat 110 from ship 100. Examples of other actions that may be included in the list of actions 212 include, but are not limited to, an action to launch an aircraft from the ship 100, and an action to navigate the ship to a certain destination.

The list of actions 212 may be specified, for example by a human expert. The list of actions 212 may be input into the environment effect assessment module 102 using the user interface 210, and stored by the database 212.

The database 208 further stores a list of questions 214. In this embodiment, the list of questions 214 includes, for each action in the list of actions 212, one or more questions corresponding to that action. The terminology "a question corresponding to an action" is used to refer to a question that is pertinent to the effective, or safe, performance of that action. In this embodiment, for the action to launch the auxiliary boat 110 from ship 100, the list of questions includes the following questions: "are the local environmental conditions suitable to safely launch the auxiliary boat 110 from ship 100?", "can a sonar system of the auxiliary boat 110 effectively operate?", and "can effective communication between the auxiliary boat 110 and ship 100 be established?". Different questions may be included in the list of questions 214 that may correspond to different actions.

The list of questions 214 may be specified, for example by a human expert. The list of questions 214 may be input into the environment effect assessment module 102 using the user interface 210, and stored by the database 212. Correspondences between the questions in the list of questions 214 and the actions in the list of actions 212 (i.e. information specifying which questions correspond to which actions) may be specified, for example by a human expert. These correspondences may be input into the environment effect assessment module 102 using the user interface 210 and stored in the database 208.

The user interface 210 is a device that is configured to receive an input from a user such that the user may input information into the environment effect assessment module 102. The user interface 210 is further configured to display information to a user, such as information received by the user interface 210 from the integration device 206. The user interface 210 may be any appropriate type of user interface and include devices such as, but not limited to, a touchscreen display, a display screen, a keyboard, a mouse, a microphone, and an audio speaker.

Apparatus, including the modules 201-204 and the integration module 206, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

Figure 3:
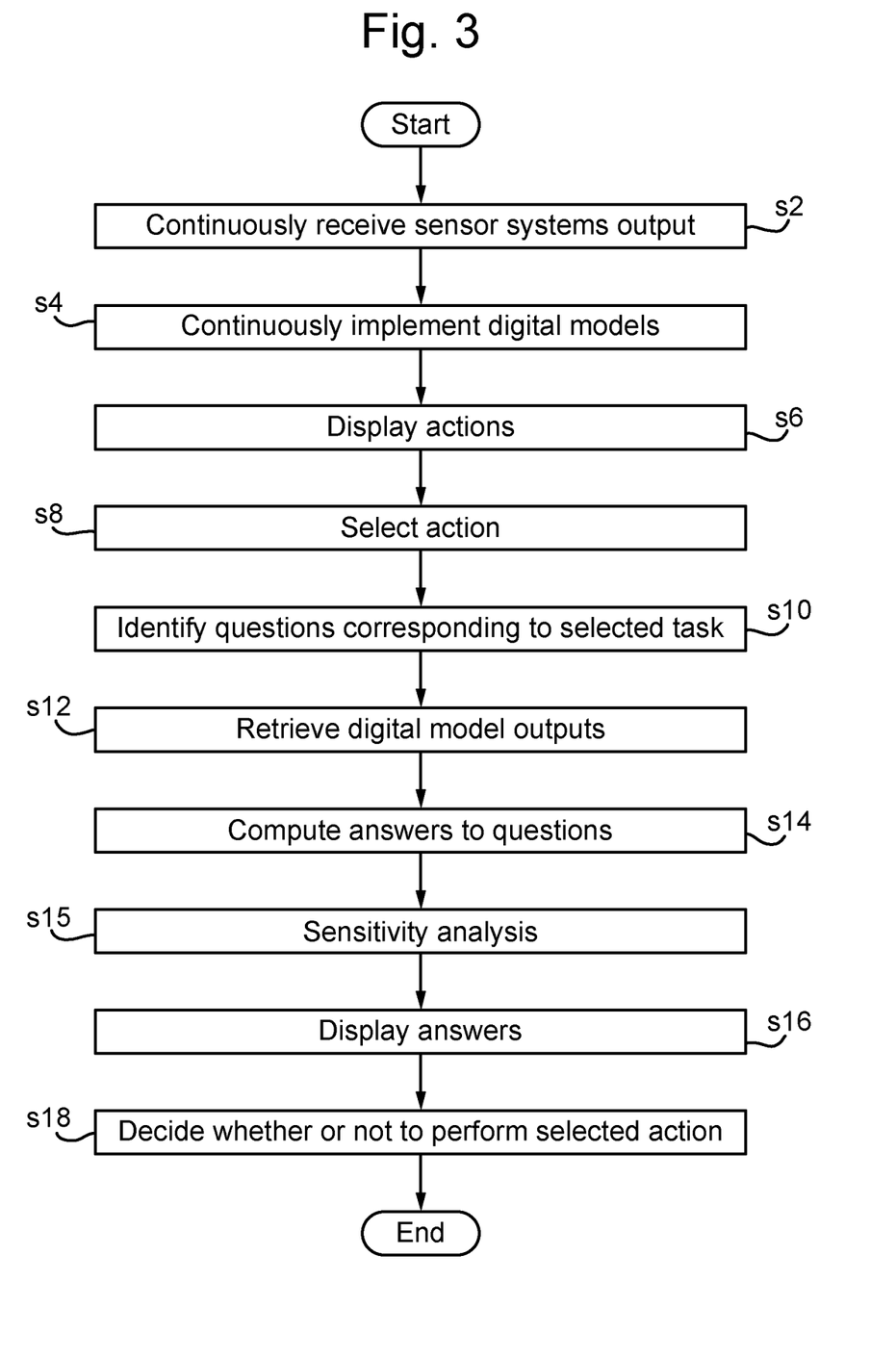
FIG. 3 is a process flow chart showing certain steps of an example process in which environmental effects are assessed by the system.

FIG. 3 is a process flow chart showing certain steps of an example process in which the environmental effect assessment module 102 is implemented.

At step s2, the sensor systems 108 continually (e.g. continuously) send their outputs to the modules 201-204. For example, values of parameters of the body of water 104, parameters of the air 106, parameters of the ship 100, and/or parameters of the auxiliary boat 110 are continuously measured and sent from the sensor systems 108 to the modules 201-204. Thus, for example, the modules 201-204 continuously receive updated water temperature and speed measurements, air temperature and wind velocity measurements, GPS coordinates for the ship 100 and/or the auxiliary boat 110, and/or inertial navigation unit measurements of the ship 100 and/or the auxiliary boat 110.

At step s4, the modules 201-204 continually (e.g. continuously) update either respective digital models using the data streamed from the sensor systems 108. Thus, for example, the first the module 201 continuously updates its digital model modelling the effect of the body of water 104 on the auxiliary boat 110, for example, were the auxiliary boat 110 to be launched from the ship 100 at the current time.

Continuously updating the digital models advantageously tends to provide that the digital models are in a "ready to use" state. In some embodiments, the digital models are updated at regular, discrete periods, e.g. as defined by a user.

At step s6, the integration module 206 retrieves the list of actions 212 from the database 208, and displays the retrieved list of actions 212 on the user interface 210. Thus, a user is presented with the list of actions 212.

The retrieval and display of the list of actions 212 may be performed by the integration module 206 responsive to receiving a user command from the user interface 210.

At step s8, using the user interface 210, the user selects a particular action from the displayed list of actions 212. In this embodiment, the user selects an action that they wish to be performed. In this embodiment, the user selects the action that the auxiliary boat 110 is launched from the ship 100. The user interface 210 sends a signal specifying the action selected by the user to the integration module 206.

At step s10, the integration module 206 identifies, from the list of questions 214 stored in the database 208, all of those questions that correspond to the selected action.

Thus, in this embodiment, the integration module 206 identifies the questions "are the local environmental conditions suitable to safely launch the auxiliary boat 110 from ship 100?", "can a sonar system of the auxiliary boat 110 effectively operate?", and "can effective communication between the auxiliary boat 110 and ship 100 be established?".

At step s12, the integration module 206 retrieves, from the modules 201-204, current values of their respective digital models. For example, the integration module 206 retrieves, from the first module 201, a current model of the effect of the body of water 104 on the auxiliary boat 110, for example, were the auxiliary boat 110 to be launched from the ship 100 at the current time.

At step s14, using the current states of the digital models of the modules 201-204, the integration module 206 computes answers to the questions identified at step s10.

Thus, in this embodiment, the integration module 206 computes answers to the questions "are the local environmental conditions suitable to safely launch the auxiliary boat 110 from ship 100?", "can a sonar system of the auxiliary boat 110 effectively operate?", and "can effective communication between the auxiliary boat 110 and ship 100 be established?".

In some embodiments, answers to one or more of the identified questions are a binary "yes or no" answer. For example, an answer to the question "are the local environmental conditions suitable to safely launch the auxiliary boat 110 from ship 100?" may be a "yes" or a "no".

In some embodiments, answers to one or more of the identified questions are provided as a score value (for example a percentage value). For example, an answer to the question "are the local environmental conditions suitable to safely launch the auxiliary boat 110 from ship 100?" may be a score value indicative of a computed safety level, for example a score between 0 and 100 where 0 is "completely unsafe" and 100 is "completely safe".

In this embodiment, answers to one or more of the identified questions are computed for the current time-step. Thus, for example, the integration module 206 determines whether or not the local environmental conditions are currently (i.e. at the current time-step) safe for launching the auxiliary boat 110 from the ship 100. In some embodiments, answers to one or more of the identified questions are computed for one or more future time-steps. Thus, for example, the integration module 206 may predict whether or not the local environmental conditions will be safe for launching the auxiliary boat 110 from the ship 100 at one or more future times (e.g. in 2 hrs time, in 4 hrs time, and/or in 6 hrs time).

In this embodiment, answers to one or more of the identified questions are computed for the current ship location. Thus, for example, the integration module 206 determines whether or not the environmental conditions at the current ship locality are safe for launching the auxiliary boat 110 from the ship 100. In some embodiments, answers to one or more of the identified questions are computed for one or more different possible ship locations. Thus, for example, the integration module 206 may predict whether or not the environmental conditions will be safe for launching the auxiliary boat 110 from the ship 100 at one or more different locations for ship 100 (e.g. using measurements or predictions of environmental conditions at those other locations).

At step s15, the user may perform a sensitivity analysis. The sensitivity analysis may be performed to assess how different values of the measured independent variables (i.e. the measurements taken by the sensor system 108) impact the computed answers to the questions.

Based on the sensitivity analysis, the user may adjust one or more of the digital models, or other system parameters. The user may then control the environment effect module 102 to cause it to re-compute the answers to the questions. This process of assessing and re-evaluating the output of the environment effect module 102 may be iterated.

The sensitivity analysis process allows a user to analyse the computed results as they are produced. Advantageously, this tends to provide the user with the opportunity to understand why the computed answers have come about, and think of ways to deal with any adverse effects.

At step s16, the integration module 206 displays the computed answers on the user interface 210.

At step s18, based on the information displayed on the user interface 210, the user decides whether or not to perform the selected action.

Thus, in this embodiment, based on the displayed answers to questions relating to the safety of current launch conditions, and the effectiveness of sonar and communication systems, the user decides whether or not to launch the auxiliary boat 110 from the ship 100. If conditions are deemed favourable by the user, the auxiliary boat 110 is launched from the ship 100, whereas if conditions are deemed unfavourable, the auxiliary boat 110 is not launched from the ship 100.

Using the displayed information, the user may decide that it is preferably (e.g. safer) to perform the selected action at a future time step instead of at the current time. The user may subsequently re-evaluate this decision using the continually updated displayed information.

Using the displayed information, the user may decide that it is preferably (e.g. safer) to perform the selected action at a different ship location. The user may navigate the ship 100 to that different location. The user may subsequently re-evaluate this decision using the continually updated displayed information.

Thus, process in which the environment effect assessment module 102 is implemented is provided.

Advantageously, digital models describing the environmental conditions local to ship and/or the effects of those conditions on the ship or and/or other systems tend to be continually (e.g. continuously) updated in real-time. This tends to allow for decision making using current system states, as opposed to based on the state of a system at some past time-step.

The above described system and method advantageously tends to improve on-ship decision making capabilities.

The above described system and method advantageously tends to reduce operator workload.

The above described system and method advantageously tends to provide users with a current, accurate, and comprehensive understanding of environmental factors that affect their actions. The user's situational awareness to readily understand updated current and forecast weather conditions tends to be facilitated. Information tends to be presented to the user in a manner that allows them to understand the environmental situation and to have the tools necessary to evaluate alternative courses of action.

It should be noted that certain of the process steps depicted in the flowchart of FIG. 3 and described above may be omitted or such process steps may be performed in differing order to that presented above and shown in FIG. 3. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the ship include an auxiliary boat that may be launched from the ship. However, in other embodiments, the ship does not include an auxiliary boat. In some embodiments, the actions and questions included in the environment impact assessment module relate to one or more different ship subsystems, or to the ship in general instead of or in addition to being related to the auxiliary boat. In some embodiments, the actions and questions included in the environment impact assessment module relate to the loading of stores to/from the ship, or to flying operations using an aircraft (e.g. a UAV) that may be launched from the ship.

In the above embodiments, the environment effect assessment module includes four modules that implement respective digital models. However, in other embodiments, the environment effect assessment module includes a different number of modules that may implement a different number of digital models.

In the above embodiments, the modules are configured to model the effects of local environmental conditions (i.e. states of the body of water and of the air) on the auxiliary boat, the effectiveness of sonar systems, and the effectiveness of communications. However, in other embodiments, one or more of the environmental impact modules models a different physical system instead of or in addition to the effects of local environmental conditions (i.e. states of the body of water and of the air) on the auxiliary boat, the effectiveness of sonar systems, and the effectiveness of communications. In some embodiments, the digital models implemented by the modules as discrete digital models, each of which models a different environmental factor and how it may affect the ship operations.

The invention claimed is:

1. A system for facilitating decision making on a watercraft, the system comprising:
    one or more processors configured to
        acquire environmental data, the environmental data comprising measurements of one or more parameters of an environment in a locality of the watercraft;
        provide a plurality of digital models, each digital model modelling an effect of the environment on a respective capability of the watercraft, each capability of the watercraft being assigned to one or more actions, each action being performable by the watercraft or an entity on the watercraft;
        using the environmental data and the digital models, model an effect of the environment on the capabilities of the watercraft;
        cause display, via a user interface, of a list of actions;
        receive a selection, via the user interface, of an action included in the list of actions;
        using outputs of each digital model that models a capability that is assigned to the selected action, determine a risk assessment for the selected action; and
        cause display, via the user interface, of the determined risk assessment.

2. The system according to claim 1, wherein the environmental data includes current measurements of the one or more parameters of the environment, and the one or more processors are configured to:
    using the current environmental data, model an effect of the current environment on the capabilities of the watercraft; and
    using outputs of each digital model that models a capability that is assigned to the selected action, determine a risk assessment for the performance of the selected action at a current time.

3. The system according to claim 1, wherein the environmental data includes predicted measurements of one or more parameters of the environment for one or more future time-steps, and the one or more processors are configured to:
    using the environmental data, model an effect of the environment on the capabilities of the watercraft at each future time-step; and
    using outputs of each digital model that models a capability that is assigned to the selected action, determine a risk assessment for the performance of the selected action at each future time-step.

4. The system according to claim 1, wherein the environmental data includes current measurements of the one or more parameters of the environment at one or more different locations, each different location being remote from the locality of the watercraft, and the one or more processors are configured to:
    using the environmental data, model an effect of the environment on the capabilities of the watercraft at each different location; and
    using outputs of each digital model that models a capability that is assigned to the selected action, determine a risk assessment for the performance of the selected action at each of the different locations.

5. The system according to claim 1, wherein the one or more processors are configured to, within a time period:
    continually acquire the environmental data; and
    using the continually acquired environmental data and the digital models, continually model the effects of the environment on the capabilities of the watercraft.

6. The system according to claim 1, wherein the one or more processors are wholly located on or in the watercraft.

7. The system according to claim 1, the system further comprising one or more sensors for deployment on or in the watercraft, the one or more sensors being configured to measure the environmental data.

8. The system according to claim 1, wherein the environmental data includes measurements of one or more parameters selected from the group of parameters consisting of: a temperature of a body of water on or in which the watercraft is operating, a salinity of a body of water on or in which the watercraft is operating, a speed of sound in of a body of water on or in which the watercraft is operating, a speed of the body of water, a flow direction of the body of water, a swell of the body of water, a wave period of the body of water, a temperature of air in which the watercraft is operating, wind speed, and wind direction.

9. The system according to claim 1, wherein:
the one or more processors are further configured to acquire navigational data for watercraft; and
modelling the effect of the environment on the capabilities of the watercraft includes using the acquired navigational data.

10. The system according to claim 1, wherein:
the watercraft includes a vehicle configured to be launched from the watercraft; and
the action is an action to launch the vehicle from the watercraft.

11. The system according to claim 10, wherein the capabilities of the watercraft include one or more capabilities selected from the group of capabilities consisting of: recovering the vehicle after launch, communicating with the vehicle, and controlling the vehicle.

12. A method for facilitating decision making on a watercraft, the method comprising:
acquiring, by one or more processors, environmental data, the environmental data comprising measurements of one or more parameters of an environment in a locality of the watercraft;
providing a plurality of digital models, each digital model modelling an effect of the environment on a respective capability of the watercraft, each capability of the watercraft being assigned to one or more actions, each action being performable by the watercraft or an entity on the watercraft;
using the environmental data and the digital models, modelling, by the one or more processors, an effect of the environment on the capabilities of the watercraft;
receiving, via a user interface, a selection of an action from a list of displayed actions; and
using outputs of each digital model that models a capability that is assigned to the selected action, determining, by the one or more processors, a risk assessment for the selected action.

13. The method according to claim 12, wherein the watercraft includes a vehicle configured to be launched from the watercraft, and
the environmental data includes measurements of one or more parameters selected from the group of parameters consisting of a temperature of a body of water on or in which the watercraft is operating, a salinity of a body of water on or in which the watercraft is operating, a speed of sound in of a body of water on or in which the watercraft is operating, a speed of the body of water, a flow direction of the body of water, a swell of the body of water, a wave period of the body of water, a temperature of air in which the watercraft is operating, wind speed, and wind direction;
the action is an action to launch the vehicle from the watercraft; and
the capabilities of the watercraft include one or more capabilities selected from the group of capabilities consisting of: recovering the vehicle after launch, communicating with the vehicle, and controlling the vehicle.

14. A computer program product including one or more non-transistor machine readable mediums encoding instructions that when executed by one or more processors cause a process to be carried out for facilitating decision making on a watercraft, the process comprising:
acquiring environmental data, the environmental data comprising measurements of one or more parameters of an environment in a locality of the watercraft;
providing a plurality of digital models, each digital model modelling an effect of the environment on a respective capability of the watercraft, each capability of the watercraft being assigned to one or more actions, each action being performable by the watercraft or an entity on the watercraft;
using the environmental data and the digital models, modelling an effect of the environment on the capabilities of the watercraft;
causing display of a list of the one or more actions;
receiving a selection of an action from the displayed list of the one or more actions via a user interface; and
using outputs of each digital model that models a capability that is assigned to the selected action, determining a risk assessment for the selected action.

15. The computer program product according to claim 14, wherein within a time period, the process further comprises:
continually acquiring the environmental data; and
using the continually acquired environmental data and the digital models, continually modelling the effects of the environment on the capabilities of the watercraft.

16. The computer program product according to claim 14, wherein the environmental data is acquired from one or more sensors on or in the watercraft.

17. The computer program product according to claim 14, wherein the environmental data includes measurements of one or more parameters selected from the group of parameters consisting of a temperature of a body of water on or in which the watercraft is operating, a salinity of a body of water on or in which the watercraft is operating, a speed of sound in of a body of water on or in which the watercraft is operating, a speed of the body of water, a flow direction of the body of water, a swell of the body of water, a wave period of the body of water, a temperature of air in which the watercraft is operating, wind speed, and wind direction.

18. The computer program product according to claim 14, the process further comprising:
acquiring navigational data for watercraft; and
modelling the effect of the environment on the capabilities of the watercraft includes using the acquired navigational data.

19. The computer program product according to claim 14, wherein the watercraft includes a vehicle configured to be launched from the watercraft, and the action is an action to launch the vehicle from the watercraft, the capabilities of the watercraft including one or more capabilities selected from the group of capabilities consisting of: recovering the vehicle after launch, communicating with the vehicle, and controlling the vehicle.

20. The system according to claim 1, wherein the capabilities of the watercraft include a capability of a sonar system onboard the watercraft.

\* \* \* \* \*